Oct. 8, 1968 M. G. ANGELOS 3,404,598
CUP-SEALED ACTUATOR WITH OBTURATING GROOVE ANCHORING
AND SEALING ARRANGEMENT
Filed Dec. 30, 1966

MITCHELL G. ANGELOS
INVENTOR

ATTORNEY ial embodiment# United States Patent Office 3,404,598
Patented Oct. 8, 1968

3,404,598
CUP-SEALED ACTUATOR WITH OBTURATING GROOVE ANCHORING AND SEALING ARRANGEMENT
Mitchell G. Angelos, Cockeysville, Md., assignor to AAI Corporation, Cockeysville, Md., a corporation of Maryland
Filed Dec. 30, 1966, Ser. No. 606,070
2 Claims. (Cl. 89—1)

ABSTRACT OF THE DISCLOSURE

An actuator is disclosed, including a case having an unrollable cup-seal which is anchored and sealed in a bore in the case by an anchor connection formed by an annular bore recess into which the cup-seal is pressed by propellant gases from radial orifices in propellant chamber, which gases also serve to unroll the cup-seal during actuation.

---

This invention relates to an actuator arrangement, and in particular to a cup-sealed actuator in which the cup seal is anchored in position through the medium of an obturating groove into which the cup seal is deformed.

In U.S. Patents 3,106,131 and 3,119,302 there are disclosed various gas-sealed actuator arrangements of a class generally described as cup-sealed actuators, in which a unitary telescoped cup seal is employed for sealing of propellent gases and imparting of movement to material to be propelled through the incremental unrolling action of the cup seal. It is desirable to provide cup-sealed actuators of this general type, of simplified construction in the assembly of the cup seal in the surrounding case or housing and the anchoring of the cup seal within the case or housing.

It is a major feature and advantage of this invention to provide a cup-sealed actuator which provides a simplified mode of assembly and anchoring of the cup seal, particularly through the medium of an initially substantially straight walled outer tubular portion of the cup seal for ease of insertion within the casing, and incorporating an obturating groove in the casing inner surface adjacent the inner end of the cup seal and into which the overlapping cup seal is deformed for anchoring and sealing of the cup seal with the case wall.

Figure 2:
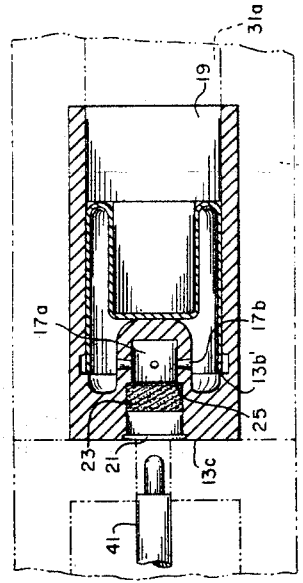
Figure 3:
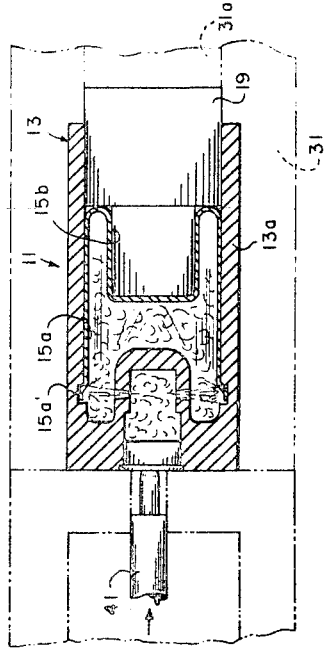
Figure 1:
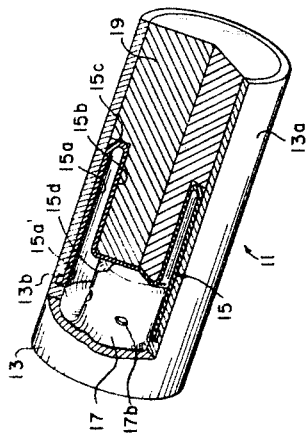
Figure 4:
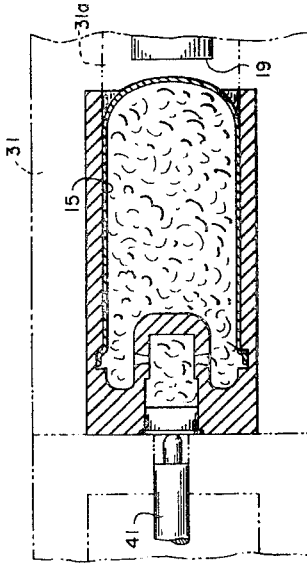

Still other objects, features and attendant advantages will become apparent to those skilled in the art from a reading of the following detailed description of one physical embodiment constructed in accordance with the invention, taken in conjunction with the accompanying drawings wherein:

FIGURE 1 is a perspective view in partial section illustrating an embodiment of the invention, FIGURE 2 is a longitudinal section view of the arrangement of FIGURE 1 prior to ignition, FIGURE 3 in a longitudinal section view similar to that of FIGURE 2, and illustrating the operation of the device shortly after ignition, FIGURE 4 is a longitudinal section view similar to that of FIGURE 3, illustrating the final configuration of the actuator cup seal after ignition and full extension of the cup seal.

Referring now in detail to the figures of the drawings, in the illustrated embodiment an actuator 11 is provided which includes a case 13 having a cylindrical wall 13a open at one end thereof, and having a closed opposite rear end 13b in which is mounted a percussion or other desired primer 21 and a gas-generating propellent charge 23. Disposed within the case 13 is a unitary cup seal 15 which is adapted to seal the propellent gases resulting from ignition of the propellent charge 23 as well as transmitting the propelling force to a propelled object 19 through the sequential incremental cold flow rolling movement of the material from the inner tubular portion 15b of the cup seal through a smoothly reverse curved annular interconnecting end portion 15c to an enlarged diameter configuration bounded generally by the cylindrical wall 13a and/or the bore 31a of a housing 31 in which the actuator 11 may be mounted for operation if desired. To this end the cup seal 15 is formed of material which is capable of permanent plastic deformation in shape and size through cold flow motion thereof, such as aluminum, nickel, etc. As used herein, the term "permanently deformed" or "permanent deformation" is intended to mean that the material is substantially self-sustaining in the deformed position and will not self-restore itself to the shape or size it originally held prior to deformation, such as would be effected in elastic deformation. The unrolling action of the cup seal 15 and the propulsion of the object 19 is essentially the same as described in each of the two U.S. Patents 3,106,131 and 3,119,302, and accordingly will not be further described in more detail.

As mentioned above, the outer tubular portion 15a of the cup seal is advantageously substantially straight walled and fits in generally complementary relation within the inner surface of the cylindrical wall 13a for ease of insertion and assembly. Formed on the inner surface of the cylindrical wall 13a is an annular groove 13b over which the inner open end of the tubular portion 15a extends, the tubular portion 15a abutting a shoulder 13b' forming the rear edge of the groove 13b. After sliding insertion of the cup seal 15 into the case 13, the object or other material 19 to be propelled may be inserted into the well formed by the inner tubular portion 15b and the reverse curved end portion 15c of the cup seal, and the extended portion of the cylindrical wall 13a, it being preferable that the propelled object be generally complementary to the well into which it fits.

Formed on the inner surface of the rear wall 13c of the casing is a propellent gas flow control chamber 17a enclosed by a housing 17, in which are formed radial gas flow orifices 17b which are directed toward the zone of the obturating groove 13b and the overlying end section 15a' of the cup seal outer tubular portion 15a.

In operation, the propellent charge is ignited through the percussion or electrical ignition of the primer pin 21, as by a firing pin 41, whereupon the easily frangible cover 25 over the propellent charge is ruptured, and the resulting quickly expanding gases proceed through the gas flow control chamber 17a and gas flow orifices 17b, being thereby directed initially toward the section 15a' of the cup seal to effect pressure-responsive deformation of the cup seal section 15a' into the obturating groove 13b, as illustrated in FIGURE 3. This deformation anchors and seals the connection between the cup seal 15 and the case 13, the cup seal provided in sequential incremental rolling action as shown in FIGURE 3 to propel the object 19 forward under the propelling force provided by the gas pressure generated within the case and bounded by the cup seal 15. The cup seal continues in its unrolling action to a final configuration as shown in FIGURE 4, or to such lesser extension as may be obtained by appropriate reduction of the propellent charge 23 to obtain a desired degree of extension of the cup seal, such as where it is not desired to propel the object 19 away from the case 13, particularly when only a limited motion of the propelled object is desired or can be accommodated.

While the invention has been illustrated and described with reference to a single illustrative embodiment, it will be apparent that various modifications and improvements may be made without departing from the scope and spirit of the invention. Accordingly, it is to be understood that the invention is not to be limited by the illustrative em- That which is claimed is:

1. An actuator comprising a case having a bore formed therein,
   an unrollable cup seal disposed in said bore and having at least an inner tubular portion and an outer tubular portion connected by a smooth curved annular end portion, means closing said inner tubular portion,
   gas pressure generating means in said case, and
   an annular recess formed on the inner surface of said bore,
   said outer tubular portion of said cup seal having an open end opposite said smooth curved annular end portion and lying longitudinally along at least a portion of the width of said recess for anchoring and sealing said cup seal within said casing,
   said cup seal being formed of a material capable of cold flow bending deformation to a self-holding permanently deformed shape,
   said gas pressure generating means being disposed adjacent said one open end portion of said cup seal, and guide means for guiding gas flow laterally toward said open end portion lying across said recess,
   said guide means comprising a propellent powder chamber housing formed within said casing and forming a closed chamber having radial gas guiding openings formed therein, and facing the zone of said annular recess,
   said gas pressure generating means comprising a charge of ignitable propellent gas generating powder within said chamber housing.

2. An actuator comprising a case having a bore formed therein,
   an unrollable cup seal disposed in said bore and having at least an inner tubular portion and an outer tubular portion connected by a smooth curved annular end portion, means closing said inner tubular portion,
   gas pressure generating means in said case, and
   an annular recess formed on the inner surface of said bore,
   said outer tubular portion of said cup seal having an open end opposite said smooth curved annular end portion and lying longitudinally along at least a portion of the width of said recess for anchoring and sealing said cup seal within said casing,
   said cup seal being formed of a material capable of cold flow bending deformation to a self-holding permanently deformed shape,
   said gas pressure generating means being disposed adjacent said one open end portion of said cup seal, and guide means for guiding gas flow laterally toward said open end portion lying across said recess,
   said guide means comprising a propellant powder chamber housing formed within said casing and forming a closed chamber having transverse gas guiding openings formed therein and facing the zone of said annular recess,
   said gas pressure generating means comprising a charge of ignitable propellant gas generating powder within said chamber housing.

References Cited

UNITED STATES PATENTS

| | | | |
|---|---|---|---|
| 2,575,071 | 11/1951 | Rockwell | 89—1 X |
| 3,106,131 | 10/1963 | Barr et al. | 89—1 |
| 3,119,302 | 1/1964 | Barr | 89—1 |

SAMUEL W. ENGLE, *Primary Examiner.*